US010464506B2

(12) United States Patent
Kiyosue et al.

(10) Patent No.: US 10,464,506 B2
(45) Date of Patent: Nov. 5, 2019

(54) WIRE HARNESS SYSTEM AND WIRE HARNESS

(71) Applicant: Yazaki Corporation, Tokyo (JP)

(72) Inventors: Kazuomi Kiyosue, Makinohara (JP); Kousuke Kinoshita, Makinohara (JP); Yukinari Naganishi, Makinohara (JP); Hiromichi Inoue, Makinohara (JP); Akinori Yoshimoto, Makinohara (JP); Yuuki Fujii, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/868,255

(22) Filed: Jan. 11, 2018

(65) Prior Publication Data
US 2018/0154846 A1 Jun. 7, 2018

Related U.S. Application Data

(63) Continuation of application No. PCT/JP2016/073098, filed on Aug. 5, 2016.

(30) Foreign Application Priority Data

Aug. 5, 2015 (JP) ................. 2015-155529
Aug. 5, 2015 (JP) ................. 2015-155530

(51) Int. Cl.
 B60R 16/02 (2006.01)
 H02G 3/16 (2006.01)
(52) U.S. Cl.
 CPC ........... B60R 16/0215 (2013.01); H02G 3/16 (2013.01)

(58) Field of Classification Search
 CPC .... B60R 16/0207; B60R 16/0215; H02G 3/16
 (Continued)

(56) References Cited

U.S. PATENT DOCUMENTS 4,815,984 A * 3/1989 Sugiyama ........... B60R 16/0239
 174/72 A
5,668,415 A * 9/1997 Nagami .............. B60R 16/0207
 174/72 A
(Continued)

FOREIGN PATENT DOCUMENTS

JP 2-144851 U 12/1990
JP 2003-79028 A 3/2003
(Continued)

OTHER PUBLICATIONS

International Search Report, issued by International Searching Authority in corresponding International Application No. PCT/JP2016/073098, dated Oct. 25, 2016, (PCT/ISA/210).
(Continued)

Primary Examiner — Harshad C Patel
(74) Attorney, Agent, or Firm — Sughrue Mion, PLLC

(57) ABSTRACT

A wire harness system (100) includes an electric connection box (110) and a plurality of sub-harnesses (120, 130, 140, 150, 160) connecting the electric connection box (110) to a plurality of electric devices (910-975). Each of the plurality of sub-harnesses has a specification to be determined for a target electric device. The electric connection box has a plurality of connection portions (111-115) that are in one-to-one correspondence with the plurality of sub-harnesses and at least one of the plurality of connection portions is a single-unit connection portion satisfying a specification of a target sub-harness without relying on other connection portion.

12 Claims, 14 Drawing Sheets

(58) Field of Classification Search
USPC .......................................... 439/76.1; 174/72 A
See application file for complete search history.

(56) References Cited

U.S. PATENT DOCUMENTS

| | | | | |
|---|---|---|---|---|
| 5,676,564 | A * | 10/1997 | Kobayashi | H01R 13/436 439/509 |
| 5,829,129 | A * | 11/1998 | Ito | B60R 16/0207 29/857 |
| 6,195,884 | B1 * | 3/2001 | Miyamoto | B60R 16/0207 29/33 F |
| 6,291,770 | B1 * | 9/2001 | Casperson | B60R 16/0207 174/139 |
| 6,392,148 | B1 * | 5/2002 | Ueno | B60R 16/0215 174/117 F |
| 6,494,722 | B1 * | 12/2002 | Sakamoto | B60R 16/0207 439/404 |
| 6,504,262 | B1 * | 1/2003 | Aoki | B60R 16/0207 307/10.1 |
| 6,702,607 | B2 * | 3/2004 | Kondo | B60R 16/0207 174/72 A |
| 6,906,261 | B2 * | 6/2005 | Kondoh | B60R 16/0207 174/2 |
| 7,561,445 | B2 * | 7/2009 | Yajima | B60K 6/445 174/72 A |
| 8,069,556 | B2 * | 12/2011 | Selbach | G02B 6/4472 29/755 |
| 2001/0002623 | A1 * | 6/2001 | Tsunoda | B60R 16/0207 174/72 A |
| 2001/0023775 | A1 * | 9/2001 | Takada | H01R 43/28 174/72 A |
| 2002/0111048 | A1 * | 8/2002 | Kondoh | B60R 16/0207 439/34 |
| 2002/0180271 | A1 * | 12/2002 | Taniguchi | B60R 16/0207 307/10.1 |
| 2002/0189843 | A1 * | 12/2002 | Ito | H01B 7/36 174/72 A |
| 2005/0130459 | A1 * | 6/2005 | Sagues | G05B 19/054 439/76.1 |
| 2006/0278423 | A1 * | 12/2006 | Ichikawa | B60R 16/0215 174/72 A |
| 2011/0079427 | A1 * | 4/2011 | Powale | H01B 3/427 174/72 A |
| 2013/0146354 | A1 * | 6/2013 | Shimada | H02G 3/0418 174/72 A |
| 2013/0161093 | A1 * | 6/2013 | Broughton | F02C 7/32 174/72 A |
| 2013/0169041 | A1 * | 7/2013 | Fukaya | B60R 16/0215 307/10.1 |
| 2014/0311796 | A1 * | 10/2014 | Gannon | H01B 7/2825 174/72 A |
| 2014/0318861 | A1 * | 10/2014 | Cox | B23P 11/00 174/72 A |
| 2014/0353029 | A1 * | 12/2014 | Tsubouchi | H01R 13/6463 174/72 A |
| 2015/0329069 | A1 * | 11/2015 | Daugherty | B60R 16/0207 174/72 A |
| 2015/0355213 | A1 * | 12/2015 | Kobayashi | G01P 1/026 324/207.25 |
| 2016/0087414 | A1 * | 3/2016 | Satoh | B60R 16/0207 174/72 A |
| 2016/0107587 | A1 * | 4/2016 | Kasuya | B60R 16/0215 174/72 A |
| 2016/0144808 | A1 * | 5/2016 | Date | H01B 7/2825 174/72 A |
| 2016/0176369 | A1 * | 6/2016 | Ito | B60R 16/023 174/72 A |

FOREIGN PATENT DOCUMENTS

| | | |
|---|---|---|
| JP | 2005-212726 A | 8/2005 |
| JP | 2012-56505 A | 3/2012 |

OTHER PUBLICATIONS

Written Opinion, issued by International Searching Authority in corresponding International Application No. PCT/JP2016/073098, dated Oct. 25, 2016, (PCT/ISA/237).

Written Opinion issued by the International Searching Authority dated Oct. 25, 2016 in counterpart International Patent Application No. PCT/JP2016/073098 (PCT/ISA/237).

* cited by examiner

WIRE HARNESS SYSTEM AND WIRE HARNESS

CROSS-REFERENCES TO RELATED APPLICATION(S)

This application is based on and claims priority from Japanese Patent Application No. 2015-155529 filed on Aug. 5, 2015 and Japanese patent application No. 2015-155530 filed on Aug. 5, 2015, and the entire contents of which are incorporated herein by reference.

BACKGROUND

Field of the Invention

The present invention relates to a wire harness system having a wire harness and an electric connection box and also to a wire harness.

Description of Related Art

In general, a wire harness has plural sub-harnesses that connect an electric connection box (e.g., a power source box incorporating a fuse cassette, a relay cassette, a fusible link cassette, etc.) to plural electric devices. The wire harness is manufactured by combining (bundling) plural sub-harnesses. On the other hand, in general, each sub-harness has one or plural wires and terminals (or a connector into which terminals are inserted) that are attached to end portions of the wires. Each sub-harness is manufactured by preparing one wire or combining (bundling) plural wires and inserting the terminals of the wires into a connector if necessary.

A system including an electric connection box and a wire harness that is manufactured in the above-described manner will be hereinafter referred to as a "wire harness system."

One conventional wire harness system (hereinafter referred to as a "conventional system") is configured in such a manner that plural sub-harnesses are connected to an electric connection box that incorporates plural relays, fuses, etc.). In this conventional system, a relay unit is formed by arranging the relays in a concentrated manner in a particular region of the electric connection box and a fuse unit is formed by arranging the fuses in a concentrated manner in another particular region of the electric connection box. Part of the plural wires of each sub-harness are connected to the relay unit and the other part of the plural wires are connected to the fuse unit. In other words, the plural wires of each sub-harness are distributed in the electric connection box so as to be located in plural regions.

As for details of the above conventional wire harness system, refer to JP 2005-212726 A

SUMMARY

In the conventional system, to distribute the plural wires of each sub-harness in the electric connection box so as to be located in plural regions, each wire (terminal) is in an independent state (i.e., not attached to any particular target) when the sub-harness has been manufactured. Each wire is attached to the relay unit or the fuse unit at a time of constructing the conventional system. That is, the conventional system requires what is called "post-fitting."

Since in general it is difficult to automate post-fitting using a machine, usually it is performed by a worker by manual work. However, from the viewpoint of reducing the cost of constructing a wire harness system by increasing the working efficiency of construction of the wire harness system, it is desirable to make the number of post-fitting locations as small as possible.

An object of the invention is to provide a wire harness system and a wire harness capable of making the number of post-fitting locations as small as possible.

Embodiments of the present invention provide the following items (1) to (10).

(1)

A wire harness system comprising a wire harness and an electric connection box, the wire harness having a plurality of sub-harnesses connecting the electric connection box to a plurality of electric devices, each of the plurality of sub-harnesses having a specification to be determined for a target electric device, and the electric connection box having a plurality of connection portions being in one-to-one correspondence with the plurality of sub-harnesses, at least one of the plurality of connection portions being a single-unit connection portion satisfying a specification of a target sub-harness without relying on other connection portion.

(2)

The wire harness system according to the item (1), wherein each of the plurality of sub-harnesses connects the electric connection box to one or a plurality of electric devices installed in a particular area of an automobile to be applied the wire harness system.

(3)

The wire harness system according to the item (1), wherein each of the plurality of sub-harnesses connects the electric connection box to one or a plurality of electric devices configured to achieve a particular system of an automobile to be applied the wire harness system.

(4)

The wire harness system according to any one of the items (1) to (3), wherein the single-unit connection portion has a first portion including a terminal connecting to an electric circuit inside the electric connection box, the target sub-harness has a second portion configured to allow it to be attached to and detached from the first portion and including a terminal connecting to a wire of the target sub-harness, and upon combining the first portion and the second portion, the first portion and the second portion form an attachment portion configured to allow a circuit connection component to be attached.

(5)

The wire harness system according to the item (4), wherein the circuit connection component is at least one of a fuse, a relay, and a fusible link.

(6)

A wire harness comprising a plurality of sub-harnesses connecting an electric connection box to a plurality of electric devices, each of the plurality of sub-harnesses having a specification to be determined for a target electric device, and at least one of the plurality of sub-harnesses having a connector portion corresponding to a single-unit connection portion among a plurality of connection portions of the electric connection box, the plurality of connection portions being in one-to-one correspondence with the plurality of sub-harnesses, the single-unit connection portion satisfying a specification of a target sub-harness without relying on other connection portion.

(7)

The wire harness according to the item (6),
wherein each of the plurality of sub-harnesses connects the electric connection box to one or a plurality of electric devices installed in a particular area of an automobile to be applied the wire harness.

(8)

The wire harness according to the item (6),
wherein each of the plurality of sub-harnesses connects the electric connection box to one or a plurality of electric devices configured to achieve a particular system of an automobile to be applied the wire harness.

(9)

The wire harness according to any one of the items (6) to (8),
wherein the connector portion has a second portion configured to allow it to be attached to and detached from a first portion and including a terminal connecting to a wire of the target sub-harness, the first portion is provided in the single-unit connection portion and includes a terminal connecting to an electric circuit inside the electric connection box, and upon combining the first portion and the second portion, the first portion and the second portion form an attachment portion configured to allow a circuit connection component to be attached.

(10)

The wire harness according to the item (9),
wherein the circuit connection component is at least one of a fuse, a relay, and a fusible link.

According to first aspect of the invention, relating to the item (1), it is not necessary to route wires to another connection portion from a sub-harness to be connected to a connection portion (hereinafter referred to "single-unit connection portion") that satisfies the specification of a connection target sub-harness by itself. Thus, at a time of manufacturing this sub-harness, all wires of the sub-harness are attached together to a connector or the like that corresponds to the single-unit connection portion. In general, wires can be attached to such a connector can be automated using a machine. That is, what is called "pre-fitting" is enabled. As such, the wire harness system having this configuration can make the number of post-fitting locations smaller than in conventional systems by a degree commensurate with the number of single-unit connection portions. Furthermore, the number of post-fitting locations can be reduced more as the number of single-unit connection portions increases; ideally, the number of post-fitting locations can be made equal to zero by making all connection portions single-unit connection portions. As such, the wire harness system having this configuration can make the number of post-fitting locations as small as possible.

In addition, the above-mentioned term "specification" means, among other things, functions that a sub-harness is required to provide in relation to connection target electric devices (e.g., a particular wire of the sub-harness should be connected to a fuse having a particular allowable current and another wire of the sub-harness should be attached to a relay having a particular characteristic). Furthermore, the above-mentioned phrase "satisfies the specification by itself" means that one connection portion satisfies the specification of the connection target sub-harness without relying on another connection portion. It is noted that the connection portion that satisfies the specification by itself need not always be formed as a single connector and may be a set of plural connectors, that is, plural connectors disposed at a single location.

According to second aspect of the invention, relating to the item (2), in the case where the wire harness system is applied to an automobile, sub-harnesses can be made independent of each other so as to correspond to particular areas of the automobile, respectively. As a result, when a sub-harness corresponding to a particular area has failed, it suffices to, for example, repair or replace that sub-harness. This increases the ease of maintenance of a wire harness system. Furthermore, where the same electric devices are installed in a particular area, the same sub-harness can be used for different automobile types, which means increase in the versatility of a wire harness system.

According to third aspect of the invention, relating to the item (3), in the case where the wire harness system is applied to an automobile, sub-harnesses can be made independent of each other so as to correspond to particular systems of the automobile, respectively. As a result, as in the above item (2), the wire harness system is increased in ease of maintenance and versatility. Furthermore, this configuration increases the expandability of a wire harness system. More specifically, if a standard sub-harness corresponding to electric devices (hereinafter referred to as "standard electric devices") relating to standard equipment of an automobile and an optional sub-harness corresponding to electric devices (hereinafter referred to as "optional electric devices") relating to equipment that is installed in an automobile optionally are made separate ones, it becomes possible to add, to a wire harness system, an optional sub-harness corresponding to selected optional electric devices. This makes it unnecessary to install wires etc. (what is called "redundant circuits") that are installed in a wire harness system redundantly irrespective of installation f optional electric devices.

According to fourth aspect of the invention, relating to the item (4), each attachment portion (e.g., a cavity in which a fuse is to be inserted) that serves to attach a circuit connection component to the electric connection box is divided into a first portion and a second portion. Thus, at a time of manufacturing a sub-harness etc. to be connected to the electric connection box, corresponding wires (terminals) can be attached to the second portion that is separate from the first portion. Such work of attachment to the second portion can be automated using a machine. That is, what is called "pre-fitting" is enabled. Thus, with the electric connection box according to the invention, even in a case that plural wires are distributed in plural locations of the electric connection box as in conventional electric connection boxes, post-fitting can be avoided by dividing an attachment portion at each of the plural locations into a first portion and a second portion and attaching the second portion to wires in advance. As such, the electric connection box having this configuration can make the number of post-fitting locations as small as possible.

According to fifth aspect of the invention, relating to the item (5), the electric connection box according to the invention can be configured as an electric connection box to which circuit connection components (fuses, relays, fusible links) that are commonly used in automobiles can be attached.

According to sixth aspect of the invention, relating to the item (6), as in the configuration of item (1), it is not necessary to route wires to another connection portion from a sub-harness to be connected to a single-unit connection portion. Thus, pre-fitting a connector portion is enabled. As such, the wire harness having this configuration can make the number of post-fitting locations as small as possible.

According to seventh aspect of the invention, relating to the item (7), as in the configuration of item (2), in the case where the wire harness is applied to an automobile, sub-harnesses can be made independent of each other so as to correspond to particular areas of the automobile, respectively. As a result, the wire harness system is increased in ease of maintenance and versatility.

According to eighth aspect of the invention, relating to the item (8), as in the configuration of item (3), in the case where the wire harness is applied to an automobile, the wire harness is increased in ease of maintenance and versatility.

In addition, by combining the configurations of items (2) and (3), it is possible to group sub-harnesses in units of an area of an automobile and group sub-harnesses in each area in units of a system. Likewise, by combining the configurations of items (5) and (6), it is possible to group sub-harnesses in units of an area of an automobile and group sub-harnesses in each area in units of a system.

According to ninth aspect of the invention, relating to the item (9), as in the configuration of item (5), post-fitting can be avoided by dividing a connector portion into a first portion and a second portion and attaching the second portion to wires in advance. As such, the electric connection box having this configuration can make the number of post-fitting locations as small as possible.

According to tenth aspect of the invention, relating to the item (10), as in the configuration of item (6), the electric connection box according to the invention can be configured as an electric connection box to which circuit connection components (fuses, relays, fusible links) that are commonly used in automobiles can be attached.

According to the invention, the wires of the sub-harnesses to be connected to the single-unit connection portions of the electric connection box can be pre-fitted. As a result, the wire harness system and the wire harness according to the invention can make the number of post-fitting locations as small as possible, which is advantageous over conventional systems and wire harnesses of conventional systems.

Several aspects of the invention have been described briefly above. The further details of the invention will be made clearer if the following description is read through with reference to the accompanying drawings.

DETAILED DESCRIPTION

Embodiment 1-1

A wire harness system (hereinafter referred to as a "first system 100") and a wire harness (a collection of plural sub-harnesses) provided in the first system 100 according to embodiment 1-1 of the present invention will be described below with reference to FIGS. 1 and 2.

Figure 1:
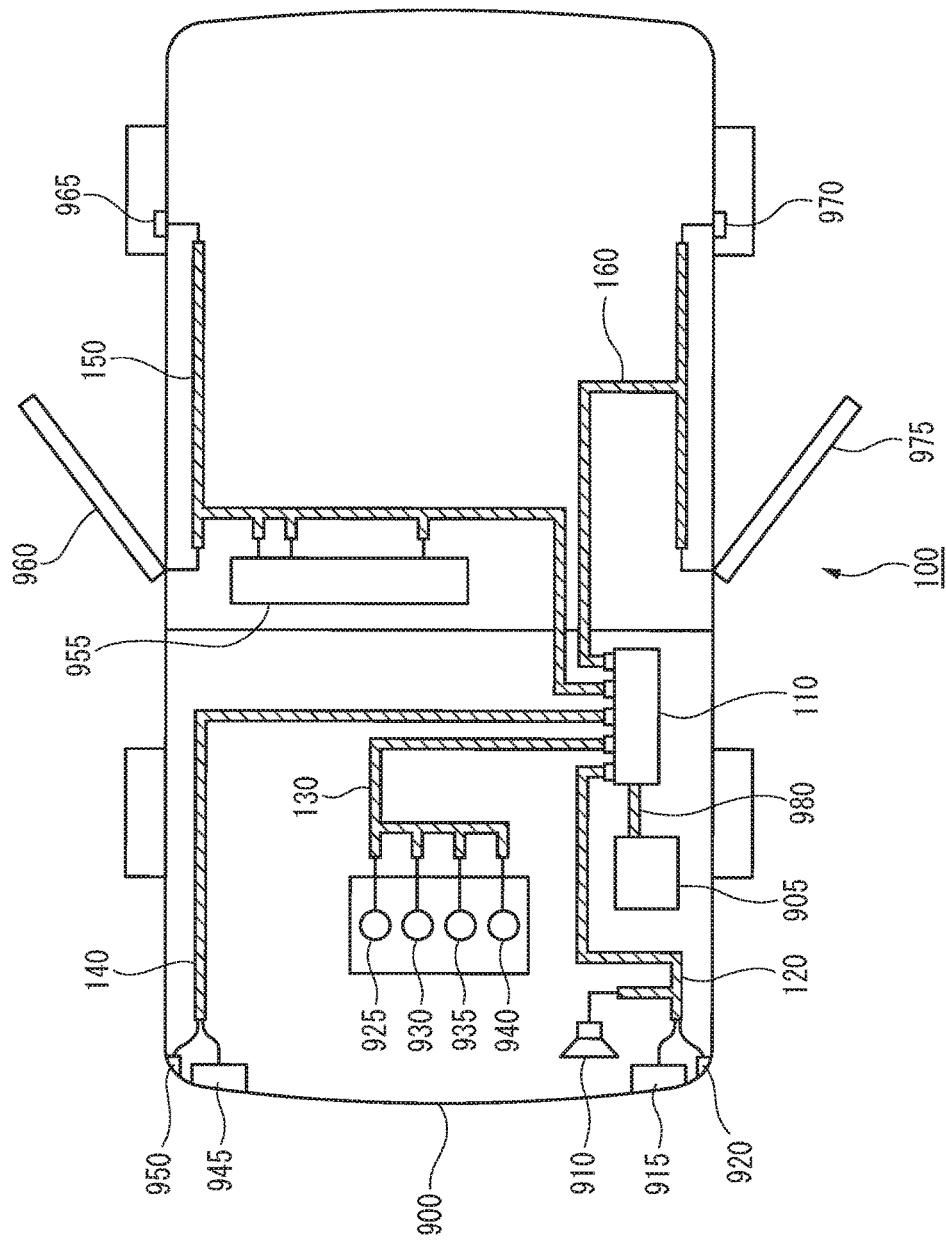
FIG. 1 is a schematic diagram showing an automobile to which a wire harness system and a wire harness according to embodiment 1-1 of the present invention is applied.

As shown in FIG. 1, the first system 100, which is applied to an automobile 900, has an electric connection box (power source box) 110 and plural sub-harnesses 120, 130, 140, 150, and 160. The plural sub-harnesses 120-160 are bundled together by a tape or the like (not shown) and thereby constitute a wire harness. Each of the plural sub-harnesses 120-160 connects one or plural electric devices installed in a particular area (described later in detail) of the automobile 900 to the power source box 110. The power source box 110 is connected to a battery 905 of the automobile 900.

More specifically, the sub-harness 120 connects a horn 910, a headlight 915, and a blinker 920 which are installed in a left area of an engine room of the automobile 900 to the power source box 110. The sub-harness 130 connects combustion-related devices 925, 930, 935, and 940 (more specifically, a fuel injector, an igniter, etc.) which are installed in an engine area of the automobile 900 to the power source box 110. The sub-harness 140 connects a headlight 945 and a blinker 950 which are installed in a right area of the engine room of the automobile 900 to the power source box 110.

On the other hand, the sub-harness 150 connects an instrument panel 955 (more specifically, various electric devices, such as meters, connected to the instrument panel 955), a door 960 (more specifically, various electric devices, such as a power window actuator, disposed inside the door 960), and an ABS actuator 965 which are installed in a right area of a vehicle compartment of the automobile 900 to the power source box 110. Furthermore, the sub-harness 160 connects an ABS actuator 970 and a door 975 (more specifically, various electric devices disposed inside the door 975) which are installed in a left area of the vehicle compartment of the automobile 900 to the power source box 110.

Figure 2:
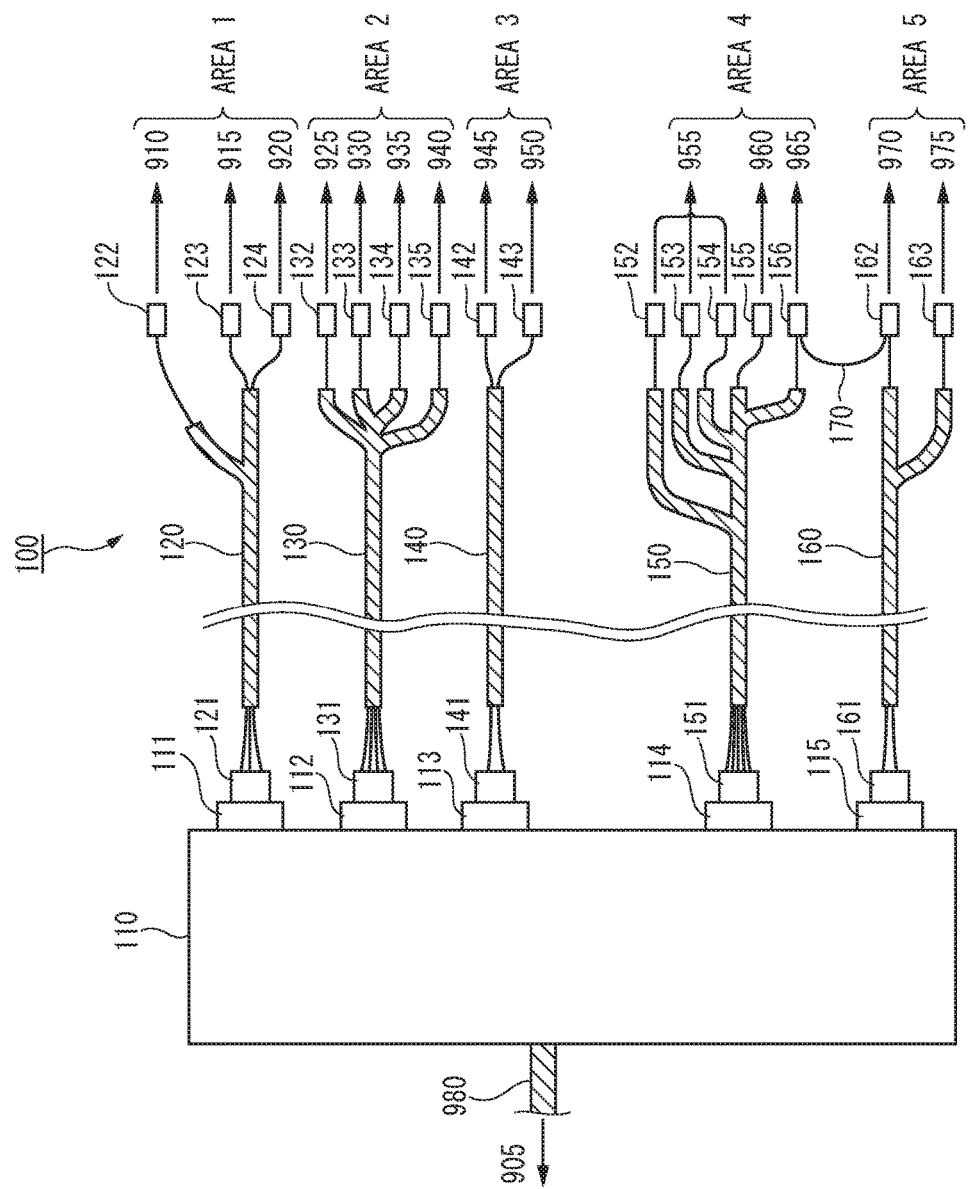
FIG. 2 is a schematic diagram for a more detailed description of the wire harness system and the wire harness shown in FIG. 1.

More specifically, as shown in FIG. 2, the power source box 110 is connected to the battery 905 by a power cable 980 and has plural connection portions 111, 112, 113, 114, and 115. The plural connection portions 111-115 are in one-to-one correspondence with the sub-harnesses 120-160. Each of the connection portions 111-115 is configured so as to satisfy, by itself, a specification of the corresponding one of the sub-harnesses 120-160 (i.e., a specification that is determined as one corresponding to connection target electric devices). Configured in this manner, each of the connection portions 111-115 is also called a single-unit connection portion.

For example, the connection portion 111 is formed so that functions (e.g., relays, fuses, etc.) that are necessary to allow operation of the horn 910, the headlight 915, and the blinker 920 which are connection targets of the sub-harness 120 are disposed together at one location. On the other hand, the sub-harness 120 which corresponds to the connection portion 111 is formed so as to have a connector portion 121 in which wire terminals corresponding to the above respective electric devices (horn 910, headlight 915, and blinker 920) are inserted (pre-fitted) and terminals 122, 123, and 124 which are connected to the respective electric devices.

More specifically, the connection portion 111 (single-unit connection portion) has a first portion (e.g., a first portion 11 (described later) shown in FIG. 7) to which terminals that are connected to an electric circuit provided inside the power source box 110 are attached. On the other hand, the connector portion 121 of the sub-harness 120 which is connected to the connection portion 111 has a second portion (e.g., a second portion 12 shown in FIG. 7) which can be attached to and detached from the first portion and to which terminals that are connected to the respective wires of the sub-harness 120 are attached. When combined with each other, the first portion and the second portion form attachment portions (e.g., cavities 13 and 14 shown in FIG. 7) that enable attachment of circuit connection components (e.g., fuses 81 and 82 shown in FIG. 7).

Each of first to third electric connection boxes 1-3 (see FIGS. 6-9) can be used as the above-described electric connection box (power source box) 110 of the first system 100.

Figure 8:
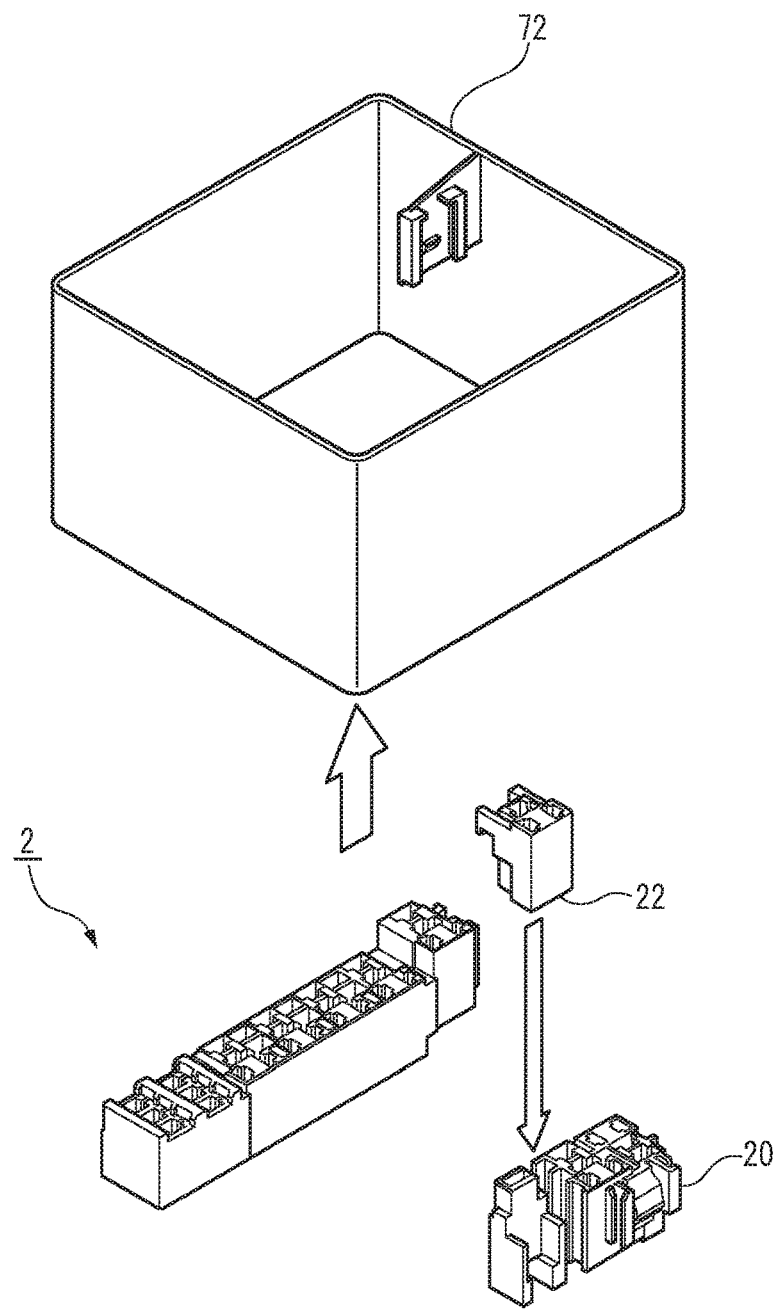
FIG. 8 is a schematic diagram illustrating how the circuit connection components are attached to the respective attachment portions shown in FIG. 7.
Figure 10:
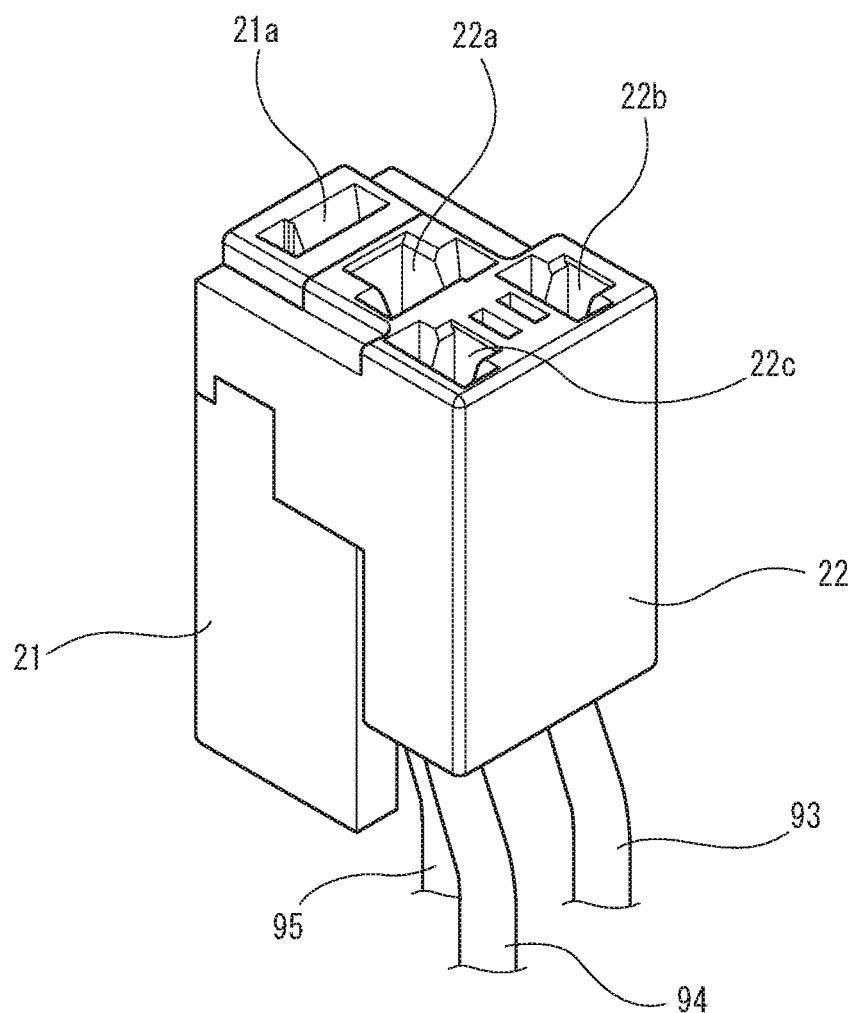
FIG. 10 is a schematic diagram showing the structure of attachment portions for attaching a circuit connection component to the electric connection box shown in FIG. 9.
Figure 14:
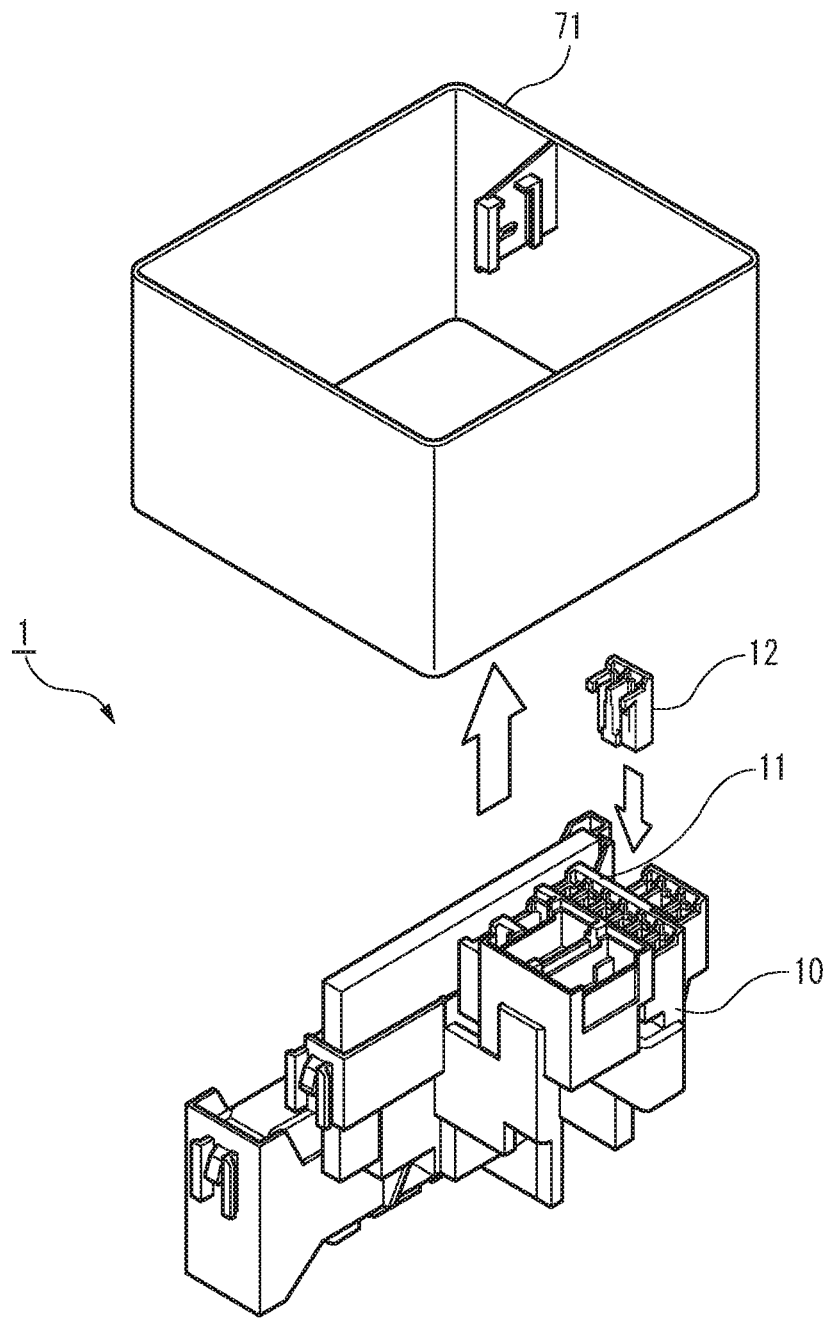
FIG. 14 is a schematic diagram illustrating how the circuit connection component is attached to the attachment portion shown in FIG. 13.

In addition, the attachment portions that are formed by the first portion of the connection portion 111 and the second portion of the sub-harness 120 are not limited to the attachment portions of the fuses 81 and 82 shown in FIG. 8 and may be an attachment portion of a 4-pole relay shown in FIG. 10, an attachment portion of a fusible link shown in FIG. 14, or the like.

With the above-described measure, the sub-harness 120 is allowed to transmit electric power, control signals, etc. to the electric devices 910-920 merely by connecting the connector portion 121 to the connection portion 111. Thus, the sub-harness 120 need not have wires for connection to the other connection portions 112-115. As a result, no post-fitting needs be performed for the sub-harness 120. Area-1 corresponding to the sub-harness 120 is the left area of the engine room.

Likewise, the connection portion 112 is formed so that functions (e.g., relays, fuses, etc.) that are necessary to allow operation of the combustion-related devices 925, 930, 935, and 940 which are connection targets of the sub-harness 130 are disposed together at one location. Correspondingly, the sub-harness 130 is formed so as to have a connector portion 131 in which wire terminals corresponding to the above respective electric devices are inserted (pre-fitted) and terminals 132-135 which are connected to the respective electric devices. The connection portions 113-115 are formed in the same manner as described above. The sub-harness 140 is formed so as to have a connector portion 141 and terminals 142 and 143, the sub-harness 150 is formed so as to have a connector portion 151 and terminals 152-156, and the sub-harness 160 is formed so as to have a connector portion 161 and terminals 162 and 163. Area-2 corresponding to the sub-harness 130 is the right area of the engine room, area-3 corresponding to the sub-harness 140 is the engine area, area-4 corresponding to the sub-harness 150 is the right area of the vehicle compartment, and area-5 corresponding to the sub-harness 160 is the left area of the vehicle compartment.

In addition, in the first system 100, the terminal 156 of the sub-harness 150 and the terminal 162 of the sub-harness 160 are connected to each other by a wire 170 for mutual communication between ABS actuators 965 and 970. The wire 170 is inserted (post-fitted) into the terminals 156 and 162 by manual work after the sub-harness 160 is connected to the power source box 110. Where a wire or the like that is not connected to the power source box 110 exists as in this case, the number of post-fitting locations cannot be made equal to zero. However, in the first system 100, post-fitting is not necessary except for the post-fitting of the wire 170.

As described above, in the wire harness (the collection of the sub-harnesses 120-160) of the first system 100, all of the wires are attached together to the connector portions 121, 131, 141, 151, and 161 which correspond to the respective connection portions 111-115 when the sub-harnesses 120-160 have been manufactured. As a result, in the first system 100, the number of post-fitting locations can be made as small as possible.

Embodiment 1-2

Next, a wire harness system (hereinafter referred to as a "second system 200") according to embodiment 1-2 of the invention will be described below with reference to FIG. 3.

Figure 3:
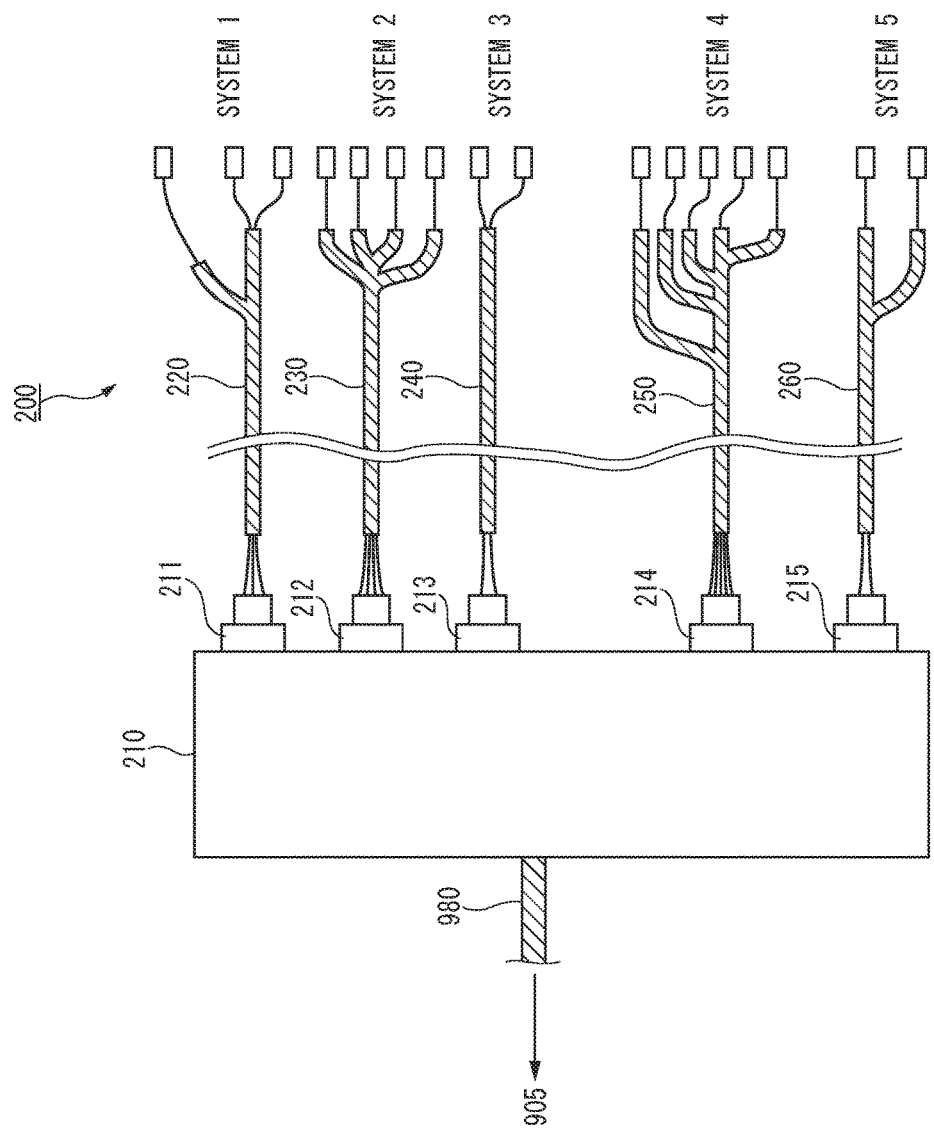
FIG. 3 is a schematic diagram for a more detailed description of a wire harness system and a wire harness according to embodiment 1-2 of the invention.

As shown in FIG. 3, the second system 200 has an electric connection box (power source box) 210 and plural sub-harnesses 220, 230, 240, 250, and 260. The plural sub-harnesses 220-260 are bundled together by a tape or the like (not shown) and thereby constitute a wire harness. The second system 200 is different from the first system 100 in that each of the plural sub-harnesses 220-260 connects one or plural electric devices for realizing a particular system of an automobile 900 to the power source box 210. The power source box 210 is connected to a battery 905 by a power cable 980.

Specific examples of system-1 to system-5 are an air-conditioner system, a car navigation system, an engine combustion control system, an ABS system, and a rear monitoring system.

Also in the case where the sub-harnesses 220-260 are provided so as to correspond to the respective systems of the automobile 900, it is possible to dispense with post-fitting for the sub-harnesses 220-260 as in the first system 100. As a result, in the second system 200, the number of post-fitting locations can be made as small as possible.

Embodiment 1-3

Figure 4:
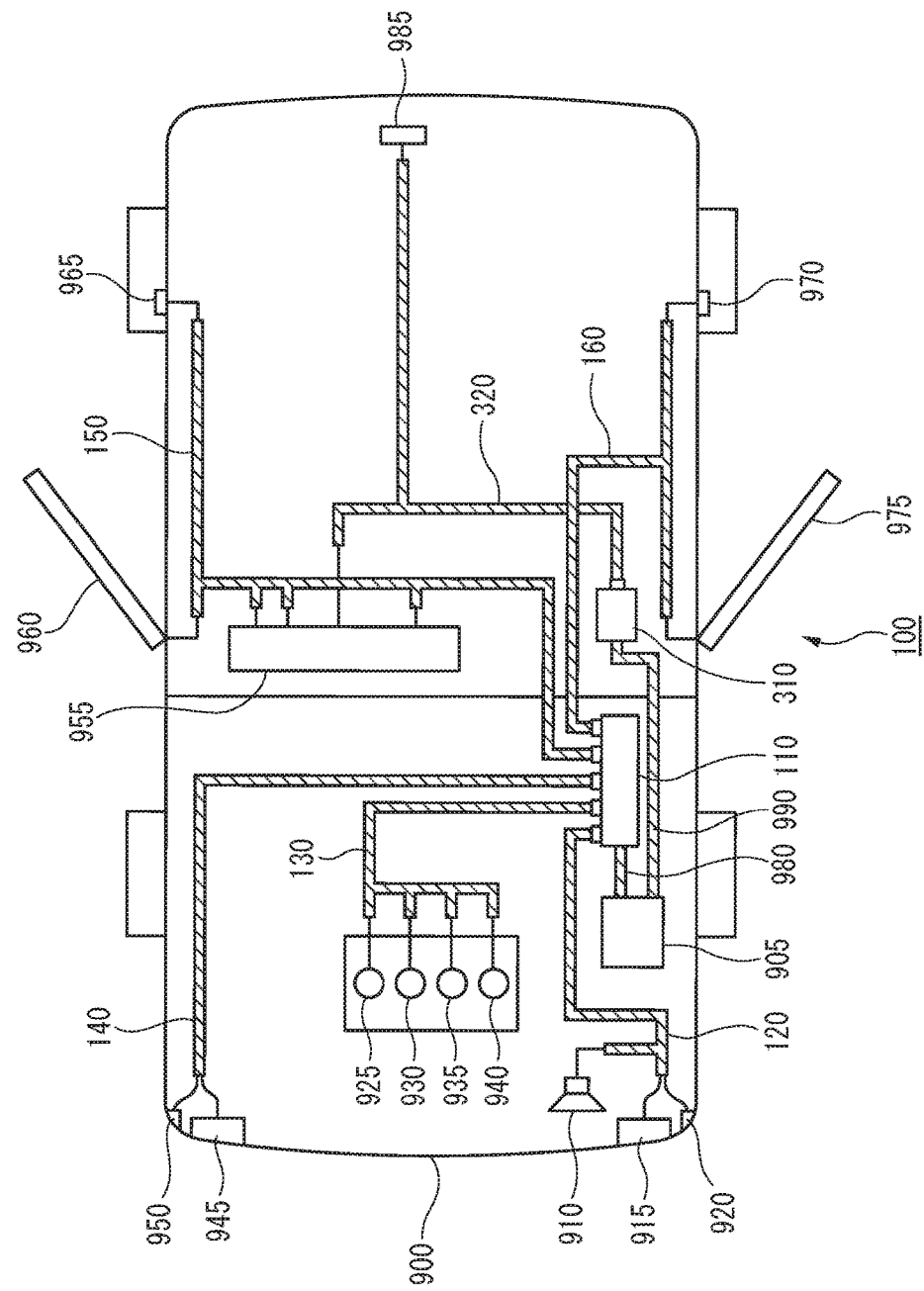
FIG. 4 is a schematic diagram showing an automobile to which a wire harness system and a wire harness according to embodiment 1-3 of the invention is applied.
Figure 5:
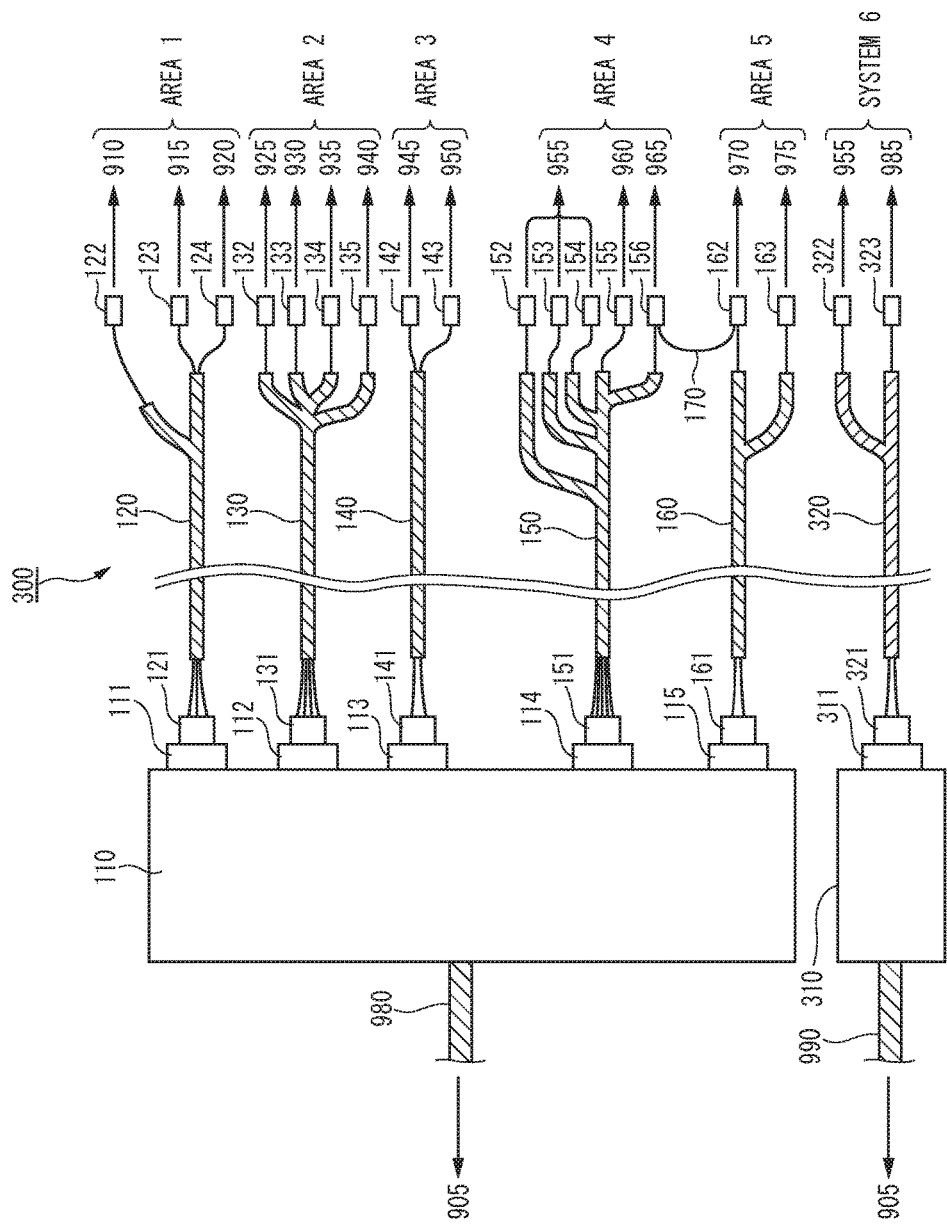
FIG. 5 is a schematic diagram for a more detailed description of the wire harness system and the wire harness shown in FIG. 4.

Next, a wire harness system (hereinafter referred to as a "third system 300") according to embodiment 1-3 of the invention will be described below with reference to FIGS. 4 and 5. In FIGS. 4 and 5, members having the same ones in FIGS. 1 and 2 are given the same symbols as the latter. Detailed descriptions for these members will be omitted where appropriate.

As shown in FIG. 4, the third system 300 has an electric connection box (power source box) 310 and a sub-harness 320 in addition to the first system 100 (i.e., the wire harness system in which the sub-harnesses 120-160 are provided for the respective areas of the automobile 900). The sub-harness 320 constitutes a wire harness by itself. The sub-harness 320 connects an electric device (i.e., a rear monitoring camera 985 as an optional electric device) for realizing a particular system (more specifically, rear monitoring system) of the automobile 900 and the instrument panel 955 to the power source box 310. The power source box 310 is connected to the battery 905 of the automobile 900.

More specifically, as shown in FIG. 5, the power source box 310 is connected to the battery 905 by a power cable 990 and has a connection portion 311. The connection portion 311 is in one-to-one correspondence with the sub-harness 320. The connection portion 311 is configured so as to satisfy, by itself, a specification of the sub-harness 320 (i.e., a specification that is determined as one corresponding to the connection target electric devices).

For example, the connection portion 311 is formed so that functions (e.g., relays, fuses, etc.) that are necessary to allow operation of the rear monitoring camera 985 and the instrument panel 955 which are the connection targets of the sub-harness 320 are disposed together at one location. On the other hand, the sub-harness 320 which corresponds to the connection portion 311 is formed so as to have a connector portion 321 in which wire terminals corresponding to the above respective electric devices (rear monitoring camera 985 and instrument panel 955) are inserted (pre-fitted) and terminals 322 and 323 which are connected to the respective electric devices. System-6 shown in FIG. 5 is a rear monitoring system.

With the above-described measure, the sub-harness 320 is allowed to transmit electric power, control signals, etc. to the electric devices 955 and 985 merely by connecting the connector portion 321 to the connection portion 311. Thus, the sub-harness 320 need not have wires for connection to the other connection portions (e.g., the connection portions 112-115 of the power source box 110). As a result, no post-fitting needs be performed for the sub-harness 320.

As described above, also in the case that as in the third system 300 the sub-harnesses 120-160 are provided for the respective areas of the automobile 900 and the sub-harness 320 which corresponds to the particular system (optional equipment) is added (i.e., area-by-area grouping and system-by-system grouping are combined), the number of post-fitting locations can be made as small as possible.

Embodiment 2-1

An electric connection box (hereinafter referred to as a "first electric connection box 1") which can be applied to the wire harness system and the wire harness according to the invention will be described below with reference to FIGS. 6, 7 and 14.

As shown in FIG. 14, the first electric connection box 1 has a fuse cassette 10 and a cover 71 which houses the fuse cassette 10. The fuse cassette 10 has a first portion 11 and a second portion 12 which constitute attachment portions (described later in detail) to which circuit connection components can be attached.

Figure 6:
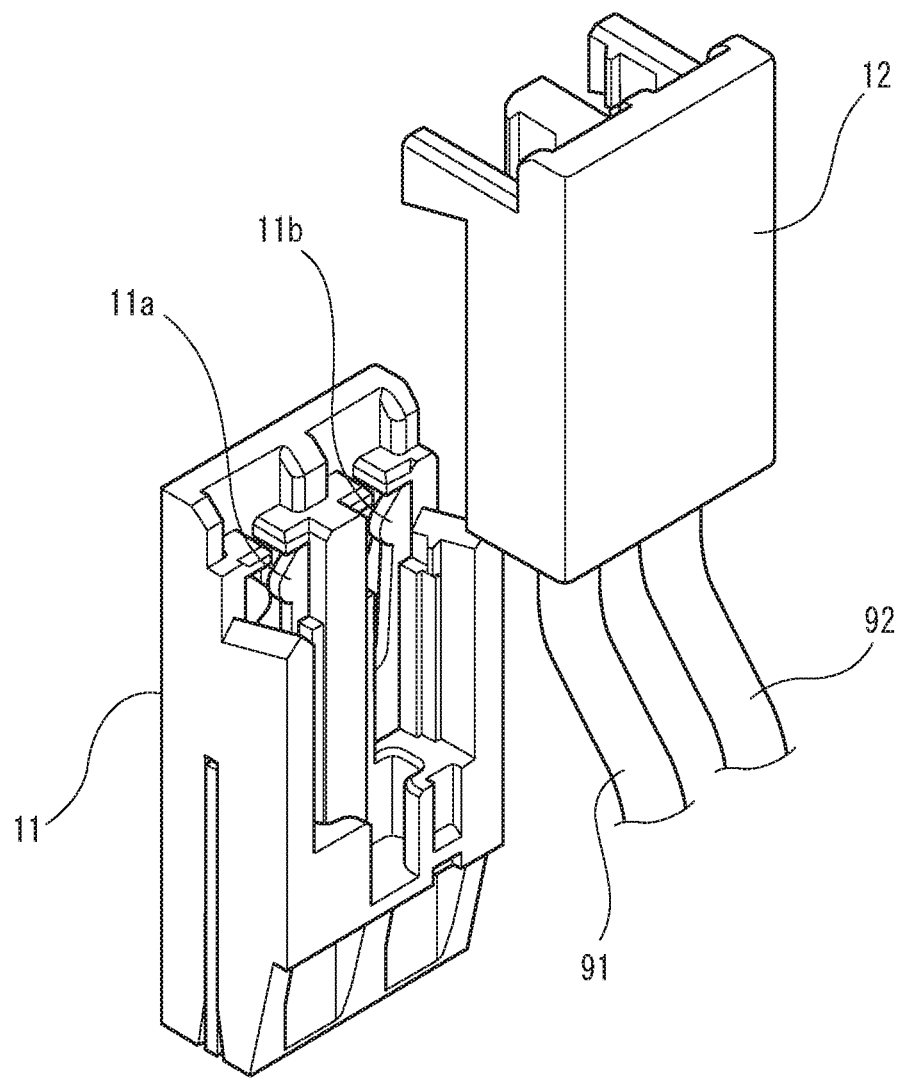
FIG. 6 is a schematic diagram showing an electric connection box according to embodiment 2-1 of the invention.

More specifically, as shown in FIG. 6, terminals 11a and 11b (in this example, tuning fork terminals connected to busbars) which are connected to an electric circuit provided inside the first electric connection box 1 are attached to the first portion 11. On the other hand, the second portion 12 can be attached to and detached from the first portion 11. And terminals (tuning fork terminals (not shown)) corresponding to the respective terminals 11a and 11b of the first portion 11) that are connected to respective wires 91 and 92 disposed outside the first electric connection box 1 are attached to the second portion 12.

Figure 7:
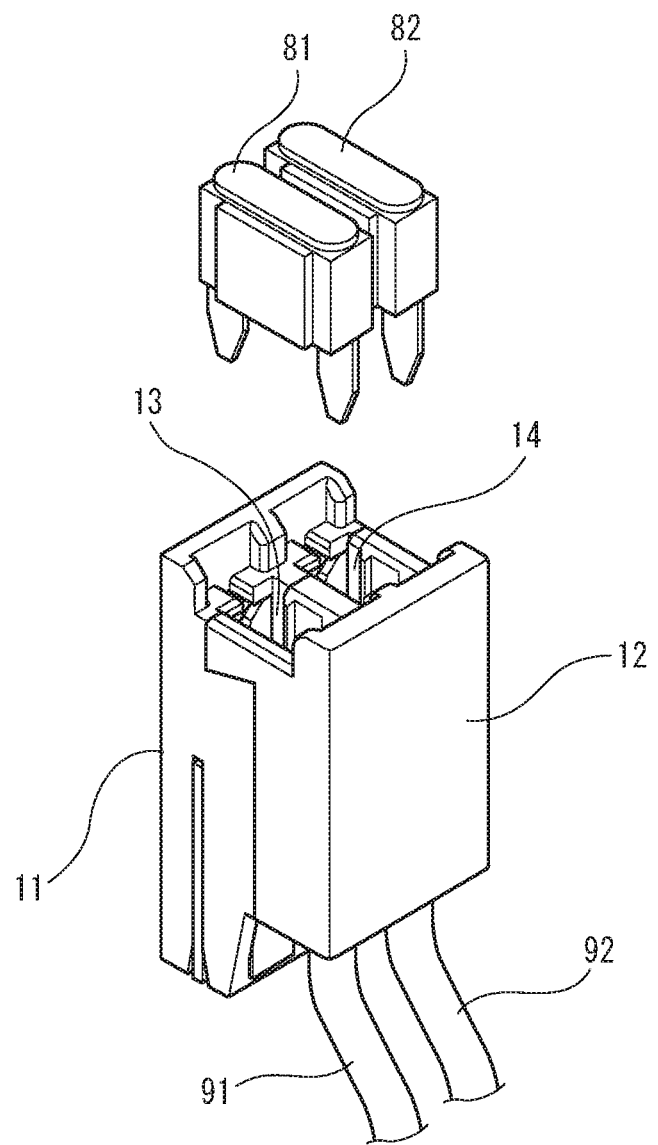
FIG. 7 is a schematic diagram showing the structure of attachment portions for attaching circuit connection components to the electric connection box shown in FIG. 6.

As shown in FIG. 7, when combined with each other, the first portion 11 and the second portion 12 form attachment portions (in this example, cavities 13 and 14). Fuses 81 and 82 as circuit connection components are attached to the respective attachment portions (cavities 13 and 14).

As described above, in the first electric connection box 1 having the fuse cassette 10, the wires 91 and 92 (terminals) corresponding to the second portion 12 that is separated from the first portion 11 can be attached to the second portion 12 when necessary. Thus, even in a case that independent (i.e., not attached to any particular targets) wires may occur as in the case of conventional electric connection boxes, post-fitting can be avoided by attaching (pre-fitting) the wires to (into) the second portion 12 in advance. As a result, with the first electric connection box 1, the number of post-fitting locations can be made as small as possible.

Embodiment 2-2

Next, the second embodiment of an electric connection box (hereinafter referred to as a "second electric connection box 2") according to the invention will be described with reference to FIGS. 8-10.

As shown in FIG. 8, the second electric connection box 2 has a relay cassette 20 and a cover 72 which houses the relay cassette 20. The relay cassette 20 has a first portion 21 and a second portion 22 which constitute an attachment portion (described later in detail) to which a circuit connection component can be attached.

Figure 9:
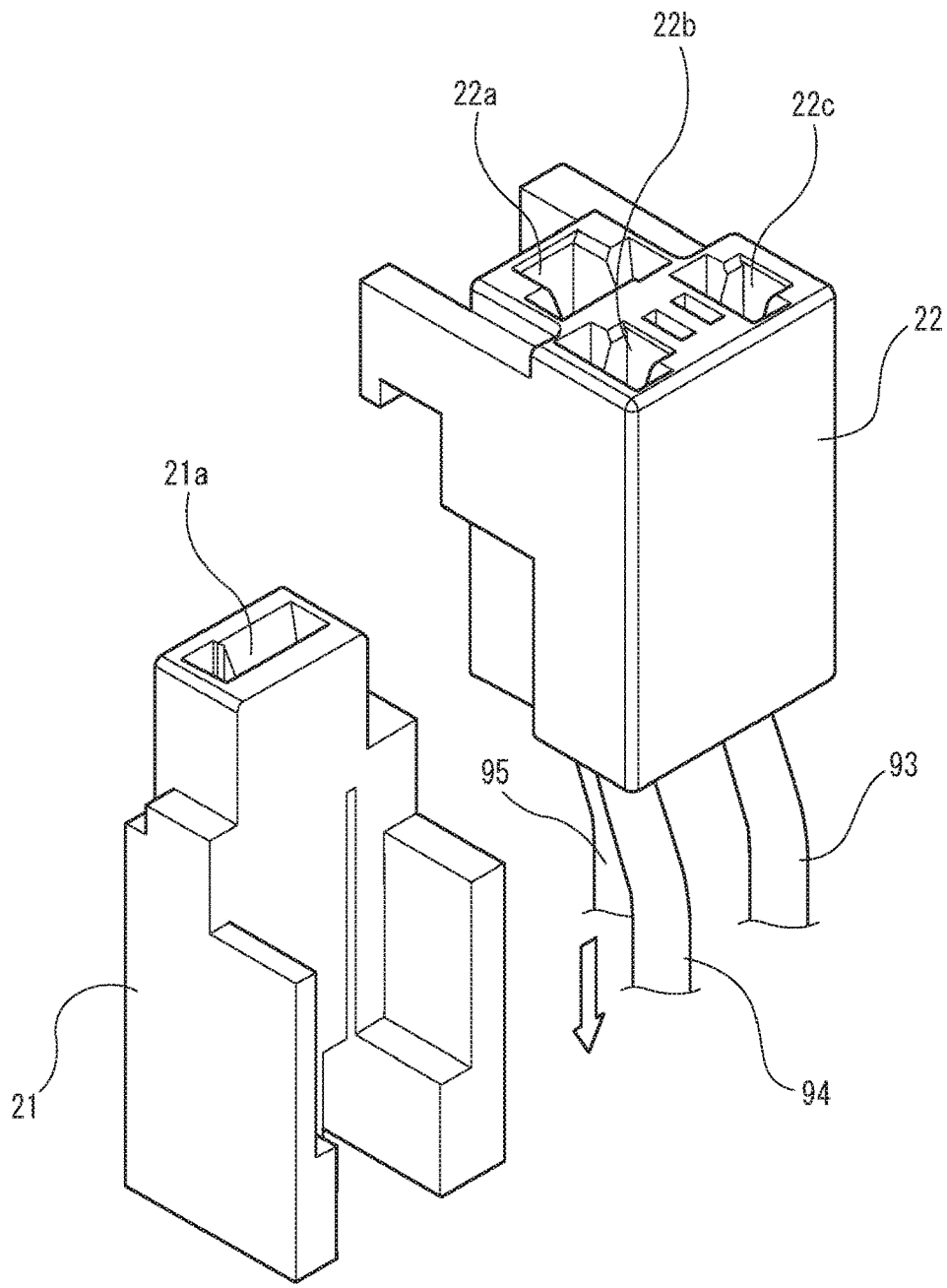
FIG. 9 is a schematic diagram showing an electric connection box according to embodiment 2-2 of the invention.

More specifically, as shown in FIG. 9, the first portion 21 is formed with a cavity 21a which houses a terminal (not shown) which is connected to an electric circuit provided inside the second electric connection box 2. On the other hand, the second portion 22 can be attached to and detached from the first portion 21, and is formed with cavities 22a, 22b, and 22c which house terminals that are connected to wires 93-95 disposed outside the second electric connection box 2, respectively.

As shown in FIG. 10, when combined with each other, the first portion 21 and the second portion 22 form attachment portions (a cavity 21a and cavities 22a, 22b, and 22c). A 4-pole relay (not shown) as a circuit connection component is attached to the attachment portions.

As described above, also in the second electric connection box 2 having the relay cassette 20, post-fitting can be avoided by attaching (pre-fitting) the wires 93-95 to (into) the second portion 22 in advance. As a result, with the second electric connection box 2, the number of post-fitting locations can be made as small as possible.

Embodiment 2-3

Next, an electric connection box (hereinafter referred to as a "third electric connection box 3") according to the invention will be described with reference to FIGS. 11-13.

Figure 11:
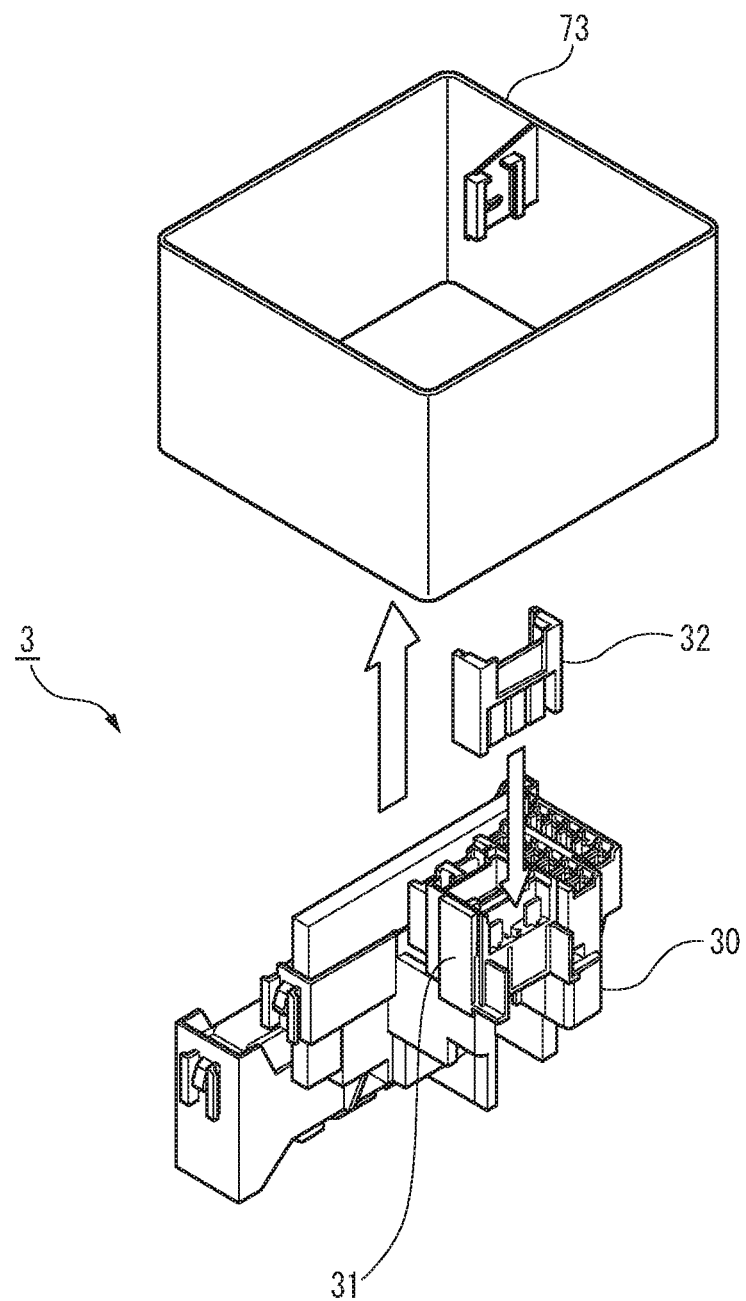
FIG. 11 is a schematic diagram illustrating how the circuit connection component is attached to the attachment portions shown in FIG. 10.

As shown in FIG. 11, the third electric connection box 3 has a fusible link cassette 30 and a cover 73 which houses the fusible link cassette 30. The fusible link cassette 30 has a first portion 31 and a second portion 32 which constitute an attachment portion (described later in detail) to which a circuit connection component can be attached.

Figure 12:
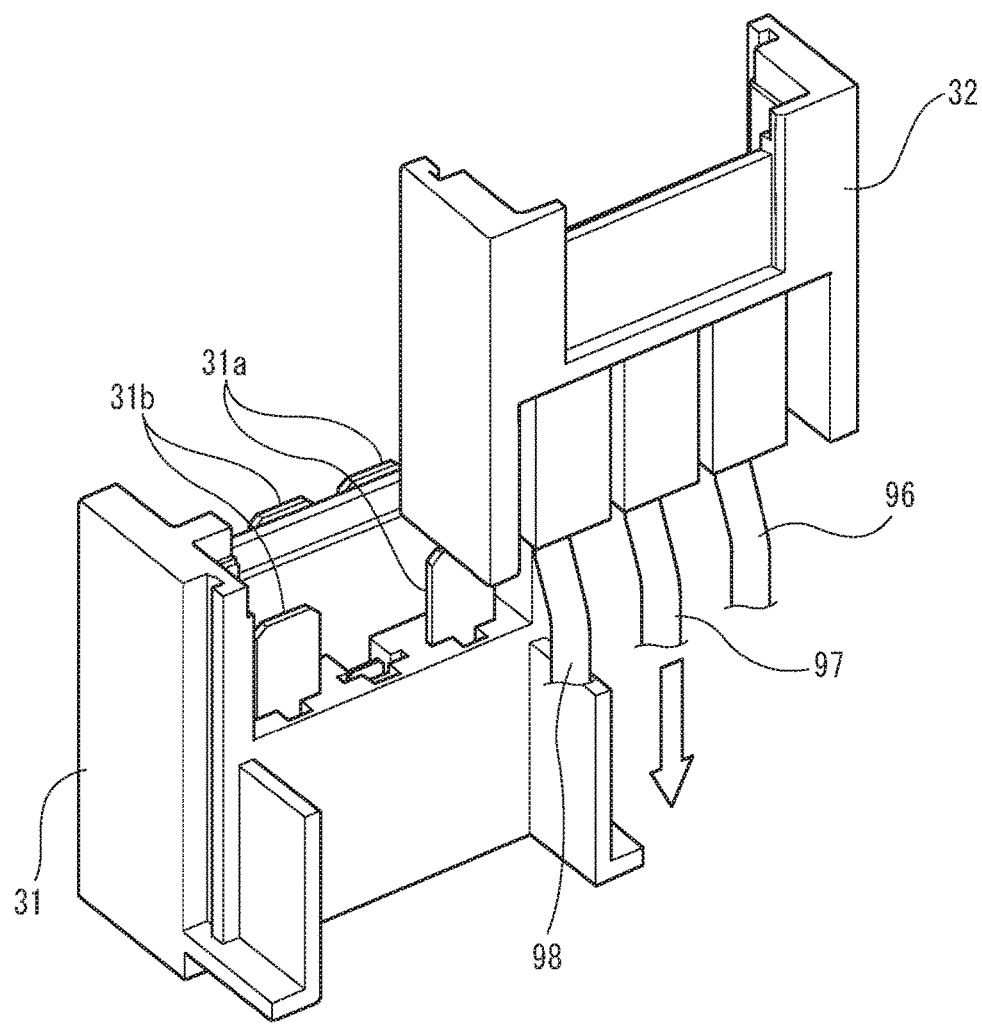
FIG. 12 is a schematic diagram showing an electric connection box according to embodiment 2-3 of the invention.

More specifically, as shown in FIG. 12, terminals 31a and 31b which are connected to an electric circuit provided inside the third electric connection box 3 are attached to the first portion 31. On the other hand, the second portion 32 can be attached to and detached from the first portion 31. And wires 96-98 disposed outside the third electric connection box 3 are attached to the second portion 32.

Figure 13:
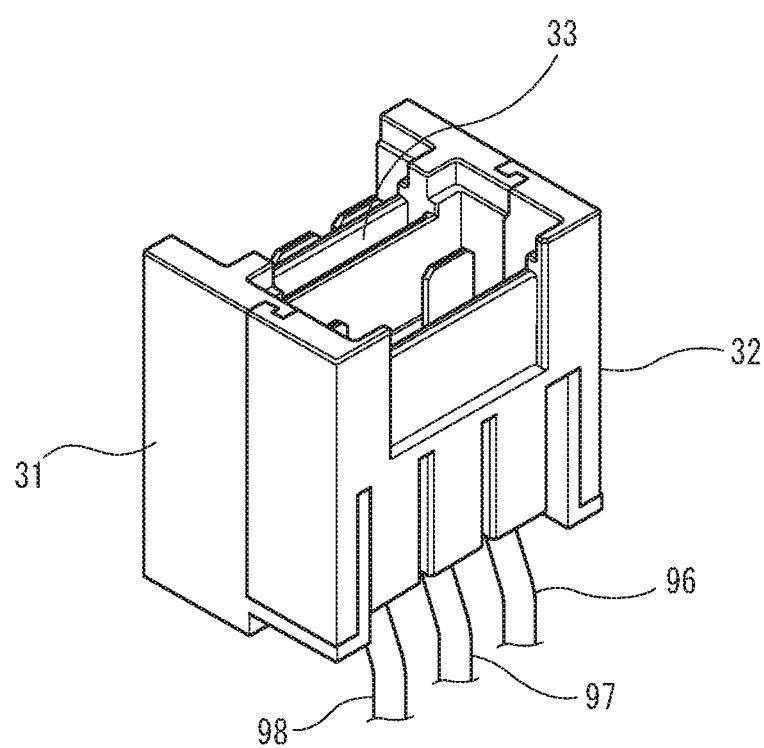
FIG. 13 is a schematic diagram showing the structure of an attachment portion for attaching a circuit connection component to the electric connection box shown in FIG. 12.

As shown in FIG. 13, when combined with each other, the first portion 31 and the second portion 32 form an attachment portion 33 (in this example, a cavity). A fusible link (not shown) as a circuit connection component is attached to the attachment portion 33.

As described above, also in the third electric connection box 3 having the fusible link cassette 30, post-fitting can be avoided by attaching (pre-fitting) the wires 96-98 to (into) the second portion 32 in advance. As a result, with the third electric connection box 3, the number of post-fitting locations can be made as small as possible.

Other Embodiments

The invention is not limited to the above embodiments, and various modifications are possible within the scope of the invention.

For example, the third system 300 is configured so as to be equipped with the power source box 310 which is separate from the power source box 110 of the first system 100. However, third system 300 need not always be equipped with the power source box 310 which is separate from the power source box 110 and may be configured so as to be equipped with only the power source box 110 (e.g., a connection portion 371 for connecting the sub-harness 320 to the power source box 110 is added).

The features of the above-described wire harness systems according to the embodiments of the invention will be summarized concisely below in the form of items (1) to (5), and the features of the above-described wire harnesses according to the embodiments of the invention will be summarized concisely below in the form of items (6) to (10):
(1)

A wire harness system comprising a wire harness and an electric connection box (110, 210, 310), the wire harness having a plurality of sub-harnesses (120-160, 220-260, 320) connecting the electric connection box to a plurality of electric devices (910-975, 985), each of the plurality of sub-harnesses having a specification to be determined for a target electric device, and the electric connection box having a plurality of connection portions (111-115, 211-215, 311) being in one-to-one correspondence with the plurality of sub-harnesses, at least one of the plurality of connection portions being a single-unit connection portion satisfying a specification of a target sub-harness without relying on other connection portion.
(2)

The wire harness system according to the item (1), wherein each of the plurality of sub-harnesses (120-160) connects the electric connection box (110) to one or a plurality of electric devices (910-975) installed in a particular area (area-1 to area-5) of an automobile to be applied the wire harness system.
(3)

The wire harness system according to the item (1), wherein each of the plurality of sub-harnesses (220-260, 320) connects the electric connection box (210, 310) to one or a plurality of electric devices (985) configured to achieve a particular system (systems 1 to 5, 6) of an automobile to be applied the wire harness system.
(4)

The wire harness system according to any one of the items (1) to (3), wherein the single-unit connection portion (111-115) has a first portion (11, 21, 31) including a terminal connecting to an electric circuit inside the electric connection box, the target sub-harness has a second portion (12, 22, 32) configured to allow it to be attached to and detached from the first portion and including a terminal connecting to a wire of the target sub-harness, and upon combining the first portion and the second portion, the first portion and the second portion form an attachment portion (13, 14, 21a, 22a-22c, 33) configured to allow a circuit connection component (81, 82, relay (not shown) to be attached.
(5)

The wire harness system according to the item (4), wherein the circuit connection component is at least one of a fuse (81, 82), a relay (not shown), and a fusible link (not shown).
(6)

A wire harness comprising a plurality of sub-harnesses (120-160, 220-260, 320) connecting an electric connection box (110, 210, 310) to a plurality of electric devices (910-985), each of the plurality of sub-harnesses having a specification to be determined for a target electric device, and at least one of the plurality of sub-harnesses having a connector portion corresponding to a single-unit connection portion among a plurality of connection portions (111-115, 211-215, 311) of the electric connection box, the plurality of connection portions being in one-to-one correspondence with the plurality of sub-harnesses, the single-unit connection portion satisfying a specification of a target sub-harness without relying on other connection portion.
(7)

The wire harness according to the item (6), wherein each of the plurality of sub-harnesses (120-160) connects the electric connection box (110) to one or a plurality of electric devices (910-975) installed in a particular area (area-1 to area-5) of an automobile to be applied the wire harness.
(8)

The wire harness according to the item (6), wherein each of the plurality of sub-harnesses (220-260, 320) connects the electric connection box (210, 310) to one or a plurality of electric devices (985) configured to achieve a particular system (system-1 to system-5, system-6) of an automobile to be applied the wire harness.
(9)

The wire harness according to any one of the items (6) to (8), wherein the connector portion has a second portion (12, 22, 32) configured to allow it to be attached to and detached from a first portion (11, 21, 31) and including a terminal connecting to a wire of the target sub-harness, the first portion is provided in the single-unit connection (111-115) portion and includes a terminal connecting to an electric circuit inside the electric connection box, and upon combining the first portion and the second portion, the first portion and the second portion form an attachment portion (13, 14, 21a, 22a-22c, 33) configured to allow a circuit connection component (81, 82, relay (not shown) fusible link (not shown)) to be attached.
(10)

The wire harness according to the item (9), wherein the circuit connection component is at least one of a fuse (81, 82), a relay (not shown), and a fusible link (not shown).

The features of the above-described electric connection box according to the invention will be summarized concisely below in the form of items (11) and (12):

(11) An electric connection box (1) comprising an attachment portion (13, 14, 21a, 22a-22c, 33) to which a circuit connection component (81, 82, relay (not shown), fusible link (not shown)) can be attached, wherein:

the attachment portion includes a first portion (11, 21, 31) to which a terminal (11a, 11b, tuning fork terminal (not shown), 31a, 31b) is attached that is connected to an electric circuit provided in the electric connection box and a second portion (12, 22, 32) that can be attached to and detached from the first portion and to which a terminal can be attached that is connected to a wire (91-98) provided outside the electric connection box; and the attachment portion is formed when the first portion and the second portion is combined with each other.

(12) The electric connection box according to item (11), wherein the circuit connection component is at least one of a fuse (81, 82), a relay (not shown), and a fusible link (not shown).

REFERENCE SIGNS LIST 1, 2, 3: Electric connection box
10: Fuse cassette
20: Relay cassette
30: Fusible link cassette
11, 21, 31: First portion
11a, 11b, 31a, 31b: Terminal
12, 22, 32: Second portion
13, 14, 21a, 22a-22c, 33: Attachment portion
81, 82: Fuse
91-98: Wire
100, 200, 300: Wire harness system
110, 210, 310: Power source box (electric connection box)
111, 112, 113, 114, 115: Connection portion
211, 212, 213, 214, 215: Connection portion
311: Connection portion
120, 130, 140, 150, 160: Sub-harness
220, 230, 240, 250, 260: Sub-harness
320: Sub-harness
121, 131, 141, 151, 161: Connector portion
321: Connector portion

The invention claimed is:

1. A wire harness system comprising a wire harness and an electric connection box,
the wire harness having a plurality of sub-harnesses connecting the electric connection box to a plurality of electric devices, each of the plurality of sub-harnesses having a specification to be determined for a target electric device, and
the electric connection box having a plurality of connection portions, each of the plurality of connection portions being in one-to-one correspondence with one of the plurality of sub-harnesses, at least one of the plurality of connection portions being a single-unit connection portion satisfying a specification of a target sub-harness without relying on other connection portion,
wherein each of the plurality of sub-harnesses comprises a set of wires,
wherein the plurality of sub-harnesses are bundled together to form the wire harness,
wherein the single-unit connection portion has a first portion including a terminal connecting to an electric circuit inside the electric connection box,
the target sub-harness has a second portion configured to allow it to be attached to and detached from the first portion and configured to connect to a wire of the target sub-harness, and upon combining the first portion and the second portion, the first portion and the second portion form an attachment portion configured to allow a circuit connection component different from the first portion and the second portion to be inserted into the attachment portion,
wherein the first portion has one or more first open portions, the second portion has one or more second open portions, and the attachment of the first portion and the second portion provides one or more cavities based on the one or more first open portions and the one or more second portions, and
wherein the one or more cavities is configured to receive terminal portions of the circuit connection component.

2. The wire harness system according to claim 1, wherein each of the plurality of sub-harnesses connects the electric connection box to one or a plurality of electric devices installed in a particular area of an automobile to be applied the wire harness system.

3. The wire harness system according to claim 1, wherein each of the plurality of sub-harnesses connects the electric connection box to one or a plurality of electric devices configured to achieve a particular system of an automobile to be applied the wire harness system.

4. The wire harness system according to claim 1, wherein the circuit connection component is at least one of a fuse, a relay, and a fusible link.

5. The wire harness system according to claim 1, wherein a first sub-harness, among the plurality of sub-harnesses, connects the electric connection box to a first group of electric devices, and
wherein a second sub-harness, among the plurality of sub-harnesses, connects the electric connection box to a second group of electric devices.

6. The wire harness system according to claim 5, wherein the first group of electric devices is installed in a first area of an automobile to be applied the wire harness and the second group of electric devices is installed in a second area of the automobile.

7. The wire harness system according to claim 5, wherein the first group of electric devices are installed as part of a first system of an automobile to be applied the wire harness and the second group of electric devices are installed as part of a second system of the automobile.

8. The wire harness system according to claim 1, the single-unit connection portion has a first portion including a terminal configured to connect to an electric circuit inside the electric connection box, and the target sub-harness has a second portion configured to be attached to and detached from the first portion and connected to a wire of the target sub-harness.

9. A wire harness comprising a plurality of sub-harnesses connecting an electric connection box to a plurality of electric devices,
each of the plurality of sub-harnesses having a specification to be determined for a target electric device, and
at least one of the plurality of sub-harnesses having a connector portion corresponding to a single-unit connection portion among a plurality of connection portions of the electric connection box, the plurality of connection portions being in one-to-one correspondence with the plurality of sub-harnesses, the single-unit connection portion satisfying a specification of a target sub-harness without relying on other connection portion, wherein each of the plurality of sub-harnesses comprises a set of wires, wherein the plurality of sub-harnesses are bundled together to form the wire harness, wherein the connector portion has a second portion configured to allow it to be attached to and detached from a first portion and including a terminal connecting to a wire of the target sub-harness, the first portion is provided in the single-unit connection portion and configured to connect to an electric circuit inside the electric connection box, and upon combining the first portion and the second portion, the first portion and the second portion form an attachment portion configured to allow a circuit connection component different from the first portion and the second portion to be inserted into the attachment portion, wherein the first portion has one or more first open portions, the second portion has one or more second open portions, and the attachment of the first portion and the second portion provides one or more cavities based on the one or more first open portions and the one or more second portions, and wherein the one or more cavities is configured to receive terminal portions of the circuit connection component.

10. The wire harness according to claim 9, wherein each of the plurality of sub-harnesses connects the electric connection box to one or a plurality of electric devices installed in a particular area of an automobile to be applied the wire harness.

11. The wire harness according to claim 9, wherein each of the plurality of sub-harnesses connects the electric connection box to one or a plurality of electric devices configured to achieve a particular system of an automobile to be applied the wire harness.

12. The wire harness according to claim 9, wherein the circuit connection component is at least one of a fuse, a relay, and a fusible link.

* * * * *